United States Patent [19]

Hubbard et al.

[11] 3,721,949

[45] March 20, 1973

[54] ECHO REPEATER TARGET

[75] Inventors: William C. Hubbard, Lemon Grove; Keith E. Geren; Warren A. Sauer, both of San Diego, all of Calif.

[73] Assignee: The United States of America as represented by the Secretary of the Navy

[22] Filed: Sept. 30, 1964

[21] Appl. No.: 400,608

[52] U.S. Cl. ......................340/3 E, 321/54, 323/108, 340/5 R

[51] Int. Cl. ..........................................H04b 11/00

[58] Field of Search......323/102, 105, 108, 109, 110, 323/120, 121, 122, 123, 124, 129; 321/54; 315/247; 340/2, 3, 3 A, 3 E, 5; 330/196, 197; 307/111

[56] References Cited

UNITED STATES PATENTS

| | | | |
|---|---|---|---|
| 2,310,097 | 2/1943 | Langguth et al | 323/109 |
| 2,347,584 | 4/1944 | Villem | 340/16 |
| 3,171,094 | 2/1964 | Geren et al | 340/2 |
| 3,183,477 | 5/1965 | Ricalzone | 340/2 |
| 3,221,242 | 11/1965 | Brook | 323/109 |

*Primary Examiner*—Richard A. Farley

*Attorney*—Louis A. Miller, Paul N. Critchlow and Truman L. Styner

EXEMPLARY CLAIM

1. In combination in a system for driving a transducer with a predetermined capacity between terminals;
   - an amplifier;
   - a source of a relatively broad bond of frequencies for driving said amplifier;
   - an inductance with terminals connected across the output of said amplifier;
   - the impedance between said terminals being matched to the output impedance of said amplifier for the optimum transfer of power;
   - a parallel tuned circuit comprising a first tuning element coupled across said inductance to parallel tune said inductance to any frequency F within said band;
   - a series tuned circuit comprising a tuning element connected in series with said transducer, said element being of predetermined reactance to series tune said transducer to said frequency F;
   - said series tuned circuit being coupled across said parallel tuned circuit so that the sign of the reactances of the series and the parallel circuits vary complementarily at frequencies above and below said frequency F.

3 Claims, 3 Drawing Figures

INVENTORS
WILLIAM C. HUBBARD
KEITH E. GEREN
WARREN A. SAUER
BY
ATTORNEYS

ECHO REPEATER TARGET

The invention described herein may be manufactured and used by or for the Government of the United States of America for governmental purposes without the payment of any royalties thereon or therefor.

This invention relates to broadband low frequency amplifiers and is particularly directed to amplifiers of the type useable in high-powered sonar repeaters.

In sonar repeaters considerable power is usually required to drive the projection transducer. Because of the power required, the available output amplifier tubes, or transistors are normally operated near the power limits of the amplifier. If the power factor of the transducer circuit should drop below 100 percent, the increased phaseless power and heating losses could easily destroy the amplifiers. Yet, the common transducers of the piezoelectric type, are predominately capacitive in nature and can easily worsen the power factor in the output circuit as the operating frequency changes.

The object of this invention is to provide an improved transducer driving circuit.

A more specific object of this invention is to provide improved coupling circuits between a power amplifier and a transducer for maintaining a high power factor over a wide band of frequencies.

The objects of this invention are attained by coupling a parallel resonant circuit as well as a series resonant circuit including the transducer between the power amplifier and the transducer. The parallel circuit includes an auto transformer, one set of windings of which are selected so as to match the impedance of amplifier. The remainder of the windings of the autotransformer are so selected that the total inductance of the windings may be tuned with a parallel condenser to the operating frequency of the system. The series resonant circuit, on the other hand, includes the transducer capacity in series with a series tuning coil resonant to the operating frequency, the series circuit being connected across the parallel resonant circuit. The parameters of the two tuned circuits are so selected that the phase-frequency characteristics of the two circuits are nearly complementary and maintain a substantially non-reactive load or a constant high power factor over a wide frequency band.

Other objects and features of this invention will become apparent to those skilled in the art by referring to the preferred embodiment described in the following specification and shown in the accompanying drawings in which.

Figure 1:
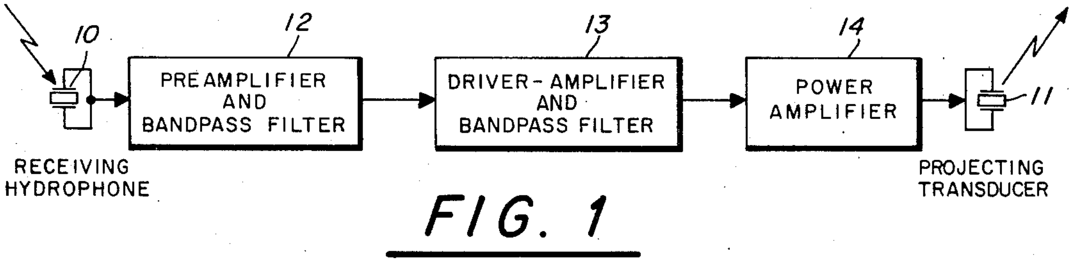
FIG. 1 is a block diagram of the repeater system in which this system in incorporated.

The repeater of FIG. 1 comprises the 100 hydrophone 10 and the projecting transducer 11 connected through the preamplifier 12 with tuned or bandpass filter circuits, driver amplifier and bandpass filter 13, and power amplifier 14. In repeaters of this type it is usually desirable to repeat frequencies in a fairly wide band. In one repeater embodying this invention the passband was relatively flat from 1,200 to 1,800 cycles per second. The power amplifier 14, in the preferred embodiment, was capable of a sustained 100 watts delivered by two push-pull connected transistor power amplifiers. The power amplifiers and their drivers are preferably of the class "B" type, to reduce the standby current. The first and possibly the second preamplifier may be class "A" amplifiers.

Figure 2:
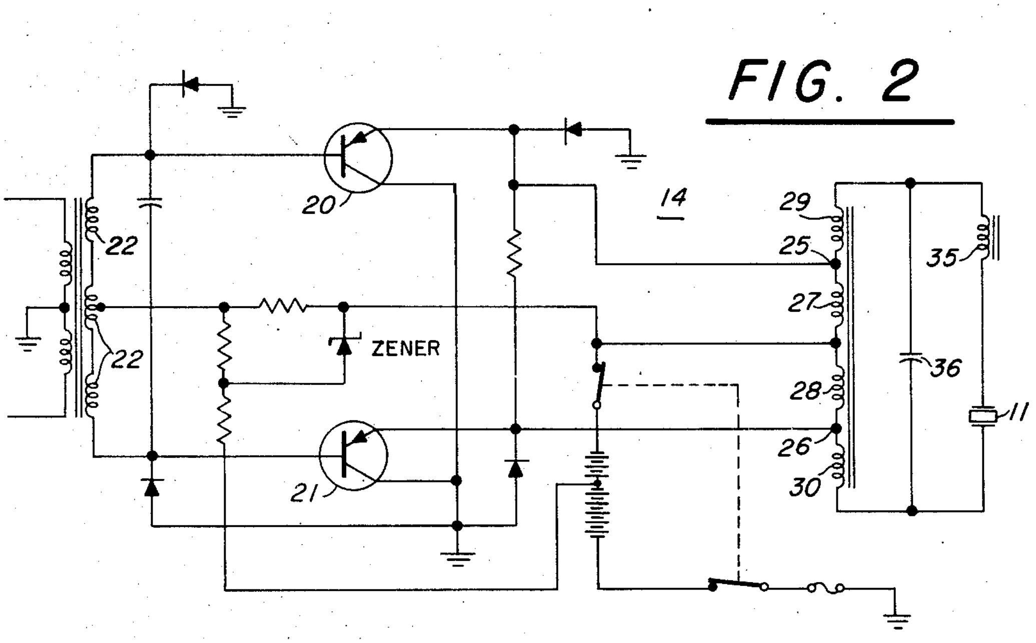
FIG. 2 is a schematic circuit diagram of the power amplifier, projecting transducer and coupling circuits employed in the system of FIG. 1.

In FIG. 2 is shown a specific power amplifier, coupled to the projection transducer 11 through the coupling circuits of this invention. The power amplifier may be single ended or push-pull as desired. Shown are transistors 20 and 21 connected in push-pull, the input comprising the center tapped transformer secondary 22. In this embodiment, the transistors were connected in the common collector configuration and the output was taken from the two emitter electrodes and applied, respectively, to the terminals 25 and 26 of windings 27 and 28 of the autotransformer shown. As usual, the center tap of the output windings is connected to the center tap of the input windings. The biasing circuits connected, as shown, are conventional and the impedance of the windings 27 and 28 are selected to match the output impedance of the amplifiers 20 and 21 to provide maximum transfer of energy to the windings with minimum losses.

Many transducers capable of handling considerable power exhibit considerable capacitive reactance between the terminals of the transducer. Such is the case with transducer 11. Since it is desirable to present to the amplifiers an essentially resistive load, it is necessary to mask the capacitive reactance of the transducer. To this end inductance 35 is connected in series with the transducer and is adjusted to such a value as to tune the transducer to a frequency within the band of frequencies to be radiated. It will be noted now that if the reactance of the transducer 11 is predetermined, it follows that the resistance of the series tuned circuit, 11–35, is predetermined, and this value may or may not match the impedance between terminals 25 and 26 of the output windings 27 and 28. Where the series impedance may be higher it is desirable to insert the windings 29 and 30 with additional inductance between the terminals 25 and 26 and the transducer series resonant circuit. Now, according to an important feature of this invention the power factor of the series resonant circuit is kept constant and near or at 100 percent throughout a wide operating frequency band. This is accomplished by connecting the tuning condenser 36 across the inductance of the output winding 27, 28, 29 and 30. According to this invention, condenser 36 is so chosen as to establish parallel resonance with the inductances 27–30 at the same frequency as the resonant frequency of the series tuned circuit. If now the resistance, and the Q, of the series resonant circuit and of the parallel resonant circuit are about equal, then the phase-frequency characteristics of the two resonant circuits will vary oppositely and substantially complementarily. The phase of the current in the series resonant circuit will vary from leading to lagging, as shown by curve 40 of FIG. 3 as the frequency varies from below to above the resonant frequency of the tuned circuit. In the case of the parallel tuned circuit, however, the phase of the current will change from lagging to leading as the frequency varies from below to above the resonant frequency, as shown by curve 41 of FIG. 3.

Accordingly, the load appearing at terminal 25 and 26 presented to the power amplifiers is essentially resistive throughout a wide frequency range and maintains a near unity power factor throughout the range.

Figure 3:
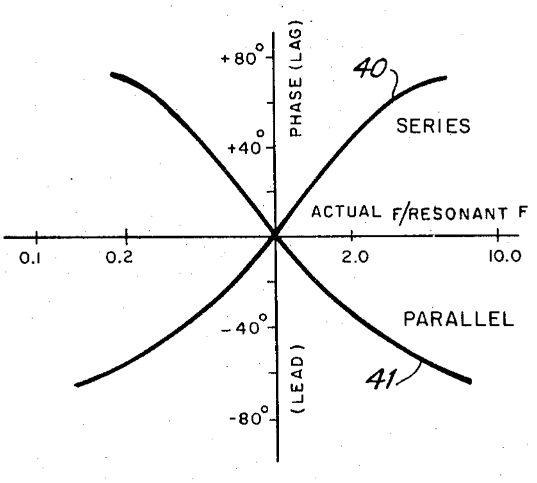
FIG. 3 is a family of characteristic phase-frequency curves for the coupling circuits of FIG. 2.

High efficiency of the coupling circuits of FIG. 3 enable maximum transfer of energy to the transducer and the operation of the amplifiers at near their maximum capacity over a wide frequency band without danger of burnout.

What is claimed is:

1. In combination in a system for driving a transducer with a predetermined capacity between terminals;
   - an amplifier;
   - a source of a relatively broadband of frequencies for driving said amplifier;
   - an inductance with terminals connected across the output of said amplifier;
   - the impedance between said terminals being matched to the output impedance of said amplifier for the optimum transfer of power;
   - a parallel tuned circuit comprising a first tuning element coupled across said inductance to parallel tune said inductance to any frequency F within said band;
   - a series tuned circuit comprising a tuning element connected in series with said transducer, said element being of predetermined reactance to series tune said transducer to said frequency F;
   - said series tuned circuit being coupled across said parallel tuned circuit so that the sign of the reactances of the series and the parallel circuits vary complementarily at frequencies above and below said frequency F.

2. In combination in a system for driving a transducer having reactive impedance between terminals;
   - a pair of amplifiers connected in push-pull, a source of a relatively broad band of frequencies for driving said amplifiers;
   - a center tapped inductance with terminals connected, respectively, to the output electrodes of said amplifiers, the impedance between said terminals being matched to the output impedance of said amplifiers for optimum transfer of power;
   - a parallel tuned circuit comprising a tuning condenser coupled across said inductance to parallel tune said inductance to any frequency F within said band;
   - a series tuned circuit comprising a tuning element connected in series with said transducer, said element being of predetermined reactance to series tune said transducer to said frequency F;
   - said series tuned circuit being connected across said parallel tuned circuit so that the sign of the reactances of the series and the parallel circuits vary approximately complementarily at frequencies above and below said frequency F.

3. The combination defined in claim 2 further comprising;
   - a bandpass filter with a center frequency for passing said broad band of frequencies;
   - said filter being connected to the input of said amplifiers.

* * * * *